(12) United States Patent
Richards

(10) Patent No.: US 6,813,085 B2
(45) Date of Patent: Nov. 2, 2004

(54) VIRTUAL REALITY DISPLAY DEVICE

(76) Inventor: Angus Duncan Richards, 5016 Kelly St., Los Angeles, CA (US) 90066

( * ) Notice: Subject to any disclaimer, the term of this patent is extended or adjusted under 35 U.S.C. 154(b) by 184 days.

(21) Appl. No.: 09/892,169

(22) Filed: Jun. 25, 2001

(65) Prior Publication Data

US 2002/0030636 A1 Mar. 14, 2002

Related U.S. Application Data

(60) Provisional application No. 60/214,251, filed on Jun. 26, 2000.

(51) Int. Cl.[7] .................. G02B 27/14; G02B 26/00; G09G 5/00
(52) U.S. Cl. .................. 359/630; 345/8; 359/291
(58) Field of Search .................. 359/290–292, 359/630, 631, 632, 633, 639; 345/8, 7, 9

(56) References Cited

U.S. PATENT DOCUMENTS

| 5,640,214 | A | * | 6/1997 | Florence | ............ 348/743 |
| 5,764,202 | A | * | 6/1998 | Welch et al. | ............ 345/8 |
| 5,954,414 | A | * | 9/1999 | Taso | ............ 353/7 |
| 6,064,398 | A | * | 5/2000 | Ellenby et al. | ............ 345/435 |
| 6,522,474 | B2 | * | 2/2003 | Cobb et al. | ............ 359/633 |

* cited by examiner

Primary Examiner—Scott J. Sugarman
(74) Attorney, Agent, or Firm—Richard D. Fuerle

(57) ABSTRACT

The present invention relates generally to various arrangements of optical and electronic components to form a high-resolution helmet mounted display (HMD) or other compact display device utilizing one or more reflective mode display devices for the generation of imagery, including those utilizing micro mirror technology.

23 Claims, 19 Drawing Sheets

Mirror HMD - Single Stage

Mirror HMD - Two Stage

Basic principles

Mirror HMD - Single Stage

Enhancements

Prismatic lens design

Binocular lens design

Lens HMD enhancements

Light sources

Light sources

Light sources

Light Sources

LED Array-1 (Monochrome LEDs)

LED array     Diffuser

R,G,B LED Array - 2

R,G,B LED     Diffuser

Optical enhancements

VIRTUAL REALITY DISPLAY DEVICE

CROSS-REFERENCE TO RELATED APPLICATIONS

This application claims priority of U.S. provisional patent No. 60/214,251 titled "Virtual Reality Display Device" filed Jun. 26, 2000 by Angus Duncan Richards.

BACKGROUND OF THE INVENTION

The present invention relates generally to various arrangements of optical and electronic components to form a high resolution helmet mounted display device (HMD).

Helmet mounted display devices (HMD's) are rapidly becoming the standard display device for virtual reality and "Teleprescence" applications. Such devices generally consist of one or more compact image displaying devices mounted on a helmet type frame that the viewer wears on their head. The said image displaying devices project images into the viewer's eyes via a series of lenses or mirrors so that the viewer perceives the image or images to originate from a source outside of the helmet. In the case of stereoscopic HMD's a separate image is presented to each of the viewer's eyes so that a three dimensional (3D) image can be formed. This 3D image has the additional reality of 3D depth cues such as stereo parallax (the differential shifting of objects within the image due to varying distance from the camera or other imaging source)

In addition to these depth cues, the viewer's perception that the "virtual" or "synthetic" world that is being presented by virtue of the HMD can be further enhanced by incorporating a tracking system on the HMD so that as the viewer moves their head (pitch, roll or yaw) the projected image moves in a corresponding manner such that it is consistent with the formation of images that would have been viewed had the viewer been moving in a similar way in the real world. The position of the viewer within the virtual world in terms of X,Y,Z (spatial coordinates) is also significant and is often utilized to change the projected images to be consistent with the viewer moving through the virtual world. This type of movement is generally not controlled directly by tracking systems of the viewer or operator but more generally by virtue of a joystick, data glove, cyberpuck or other spatial positioning device.

At present, the preferred HMD display technology is utilizing compact color LCD (liquid crystal display) panels. However monochrome LCD panels and monochrome and color CRT (cathode ray tube) type displays have also been used to good effect.

The most important factors in the choice of the type of display technology chosen for an HMD is image quality and the compactness of the display.

As HMD's generally have very wide viewing angles (the angle subtended from the corners of the image to the pupil of the viewer's eye) the image resolution becomes a very important factor. Currently, CRT technologies (particularly monochrome CRT's) offer the highest resolutions. Unfortunately they tend to be rather bulky devices and require high voltages and have a relatively high power consumption. It is possible to optically combine several monochrome display devices to form a full color image. Such techniques are well established and are known to those experienced in the field. Utilizing such techniques it is possible to achieve high resolutions and full color, however bulkiness and weight of the resulting display device is often too great for a helmet mounted application.

LCD panels overcome many of these problems by virtue of their compact size and low power consumption. However, they traditionally have several disadvantages from CRT's. The first of these is that their resolution is significantly lower than state of the art CRT's and their color saturation is also significantly less than the corresponding CRT type display. This results in a reduced color space (as shown in FIG. 37). Traditionally LCD's have also had a significantly slower response time (time taken for a pixel to change from 10% to 90% brightness or vice versa), which has been a problem for use with rapidly changing images. However, the newer LCD technologies such as TFT (thin film transistor) and dual active scan LCDs have effectively addressed these problems.

The most significant single problem now facing designers of HMDs is that of resolution. Most current low-medium performance HMD's utilize 0.7" color LCD's. These offer a resolution of approximately 180,000 pixels (red, green, and blue pixels counted separately). This means that the display is capable of approximately 60,000 color picture elements. HMD's of this quality display relatively poor images and result in a significantly diminished virtual reality (VR) effect. Improved technology in recent years is resulting in a new generation of compact high resolution LCD panels that offer significant advantages over these earlier designs. It is now possible to purchase compact color LCD panels with resolutions as high as 640*480 (307,200) color triads (color picture elements). This is equivalent to a pixel count of approximately 920,000. However, at present these displays are very expensive, resulting in HMD's utilizing these LCD panels to be priced well outside the general computer/gaming market.

Even at these resolutions the viewing angle is often still reasonably limited, which results in a reduced visual impact of the HMD. Other solutions to this problem which have been attempted are optical fibre display's and direct retinal scanning. The first approach utilizes a bunch of optical fibers to optically couple a high resolution image from a relatively bulky remote image source to the HMD. This makes possible a display with a color pixel count in the 1,000,000 region whilst retaining a lightweight HMD. Unfortunately, this type of display tends to be extremely expensive and, although technically feasible, is priced way out of the general computer/gaming market. The second approach is very new and at the present time would seem to be still at the theoretical/early prototype stage. The basic approach is to scan a colored beam of light (probably consisting of three co-axial beams of red, green, and blue light) directly onto the retina of the viewer's eye thereby rendering an image. The approach seems to have many merits. The first and foremost being that it is theoretically possible to achieve high resolutions. In addition, if micro LASERs or LEDs are used as the light source then (by virtue of their high color purity) a much enhanced color space is achievable. Theoretically, the color space of such a display could be significantly superior to that of a CRT type display. Although theoretically attractive, this approach has several major technical hurdles that have to be overcome for the device to become a commercial success. It would appear that, at this stage, these technical hurdles are the generation of sufficiently compact light sources that can produce a collimated full color scanable light beam and the generation of a very compact high speed optical scanning apparatus for scanning the said beam of light across the viewers retina.

BRIEF SUMMARY OF THE INVENTION

An alternative approach that I have developed is a "midground" between the two approaches. It is possible to utilize a micro-mirror device such as those produced by Texas instruments to direct monochrome light from a compact source through a series of lenses, mirrors, or a combination of both, to the eyes of a viewer to produce a high resolution color image. Further, it is possible by changing the color of the monochrome light and by projecting the image as a sequence of the red, green, and blue (or other acceptable optical primaries such as orange, green, and blue) components of the image to produce a full color image with a color resolution equivalent to the resolution of the digital micro-mirror device (DMD) i.e. the apparent pixel resolution will be three times as great as the actual resolution of the DMD chip. This configuration has all of the advantages of both of the previous HMD display technologies. Firstly, the optical system is relatively simple and requires none of the complex active components that comprise the scanning device of the direct retinal display. However, the DMD technology can offer significantly higher resolutions than the LCD technology. DMD chips have been fabricated with resolutions close to the 2,000,000 pixel mark, which would result in an equivalent HMD resolution of 6,000,000 pixels per eye. The DMD chips are very compact and readily lend themselves to incorporation into a HMD shell. In addition, the purity of the light source bounced off the DMD is entirely independent of the DMD chip. Thus, it is possible by using LED or LASER light sources to achieve an optimal color space that could easily surpass CRT type displays (see FIG. 37).

There are many reasons why this design is the preferred implementation. Firstly, it offers the best features of all previous HMD technologies. Secondly, it is proven technology and thirdly by virtue of the DMD fabrication techniques, it lends itself effectively towards the VR (virtual reality) environment. An example of this is shown in FIG. 35. As can be seen, it is possible to produce several DMD arrays on a single chip. Ordinarily, this configuration would be unacceptable for video projection as it would produce dark lines at the interstices of the DMD arrays. However, in the case of VR, the surrounding display regions fall into the peripheral vision part of the viewer's eye's and thus the viewer is relatively insensitive to the image discontinuity.

Figure 1:
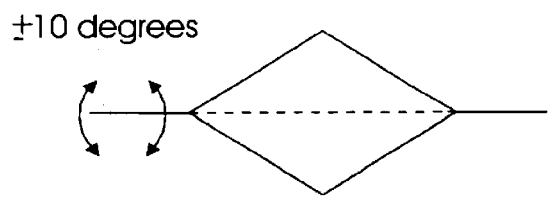
FIG. 1 is a side view illustrating the operation of a single micro-mirror cell
Figure 2:
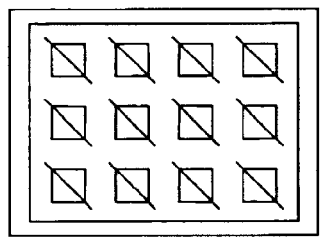
FIG. 2 is a plan view showing a micro-mirror array.
Figure 3:
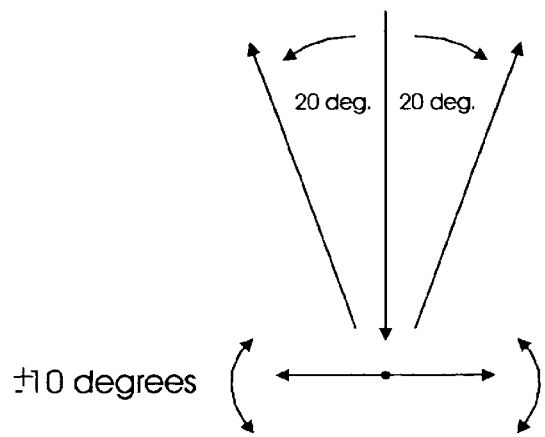
FIG. 3 is a front view illustrating the operation of a single micro-mirror cell.

A micro-mirror array consists of a large number of tiny square mirrors which are pivoted at the corners as shown in FIG. 1. The mirrors can be tilted approximately +−10 degrees by applying the appropriate control signals to the digital micro-mirror (DMM) device. The angle of tilt of the mirror is digital in nature (hence the name digital micro-mirror device). That is to say, the mirror can be either in the +10 or −10 degree tilt but not in any position in between. Analogue control of the light level of the red, green, and blue components for each pixel is achieved by varying the time in which the mirror stays in each of the two states (i.e. angle of tilt). One of the states (phase 1) is the active state, i.e. when the mirror is in this state, light will be reflected into the viewing optics of the HMD. The other state (phase 2) is the rest state in which light is reflected away from the viewing optics. By altering the proportion of time that each mirror in the DMM array stays in one of the two states it is possible to simulate any analogue level from zero to 100 percent. It should be noted, however, that the break down of time allocated to each of the primary colors does not necessarily follow that defined in the color standards. This is because the time allocation is affected by the relative brightness of the component light sources used to illuminate the DMD. For example, if the red light source was proportionately brighter than the green and blue light sources, as may be the case for an incandescent light source, then the color can be corrected by simply reducing the proportion of time that is allocated to displaying the red component of the image. This characteristic is of great benefit to the designer because it makes possible an optimization of the display to the available light source. This is particularly important if LEDs are to be used as the light source as the green LEDs tend to have a lower intensity than their red and blue counterparts. There are, of course, limits to how far the time distribution can be skewed. These limits are defined mainly by the traverse rate or response time of the DMM array. At present, each mirror can respond in approximately 20 microseconds. During this period of transition the mirror is an indeterminate state and may or may not contribute to the image brightness of the given pixel. During this period the mirror can be considered as providing optical noise (uncertainty) to the image. Given that there are two transitions per color period, the color resolution (number of quantizing levels) for each color can be determined from the amount of time available for each color display "field" and the response time of the DMD. Obviously if each color is to be allocated the same number of quantizing levels there should be an equal time allocated to each of the primary colors. In such a case the total time for the image "frame" would comprise of three equal "color field" periods. This optimal situation is not achievable if there is also a delay in changing the light source from one color to the next, as is the case in DMM projectors utilizing color wheels. In this case there is also a "dead period" in which the DMM array sends all the mirrors to the phase 2 state until the color transition has completed. This "dead period" can be eliminated by utilizing light sources such as LEDs or LASERS which have very fast switching times.

The primary advantage that DMM technology has over LCD and CRT technologies is that there is a total absence of persistence of the image; i.e., as soon as the time period for each color ends there is no trace of the previous image. This characteristic makes possible the integration of the three monochrome images into a full color image. In addition, this characteristic also makes possible the generation of two separate images from a single DMD. The generation of multiple images from a single DMD is possible without degrading the spatial resolution of the images. However as there is only a finite "Window of time" available to complete the six color images (left image red, green, and blue then right image red, green, and blue) the multiplexing of the two images (left and right) will result in either a reduction in the refresh rate of the display or a reduction in the color resolution. With the present DMM technology, the multiplexing of two images from a single DMD will result in reducing the color resolution from 8 bits per color (24 bits total) to 7 bits per color (21 bits total) or a reduction of the refresh rate from 60 frames per second to 30 frames per second). Of the two alternatives, a reduction in color resolution is probably the preferred choice as a 30 frame per second image flicker is perceivable by the human eye. This drawback is only a temporary consideration as improvements in the response speed of the DMM devices will widen the color resolution accordingly.

Figure 4:
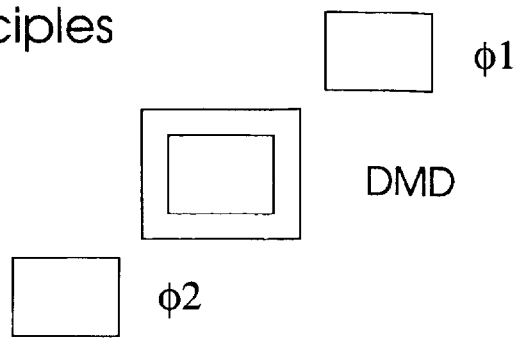
FIG. 4 is a plan view showing the relative placement of a micro-mirror array and the envelope of the resultant reflected light from the micro-mirror array in each of two mirror phases 1 and 2, which would result if the source of illumination was placed on a normal to the center of the micro mirror array.
Figure 5:
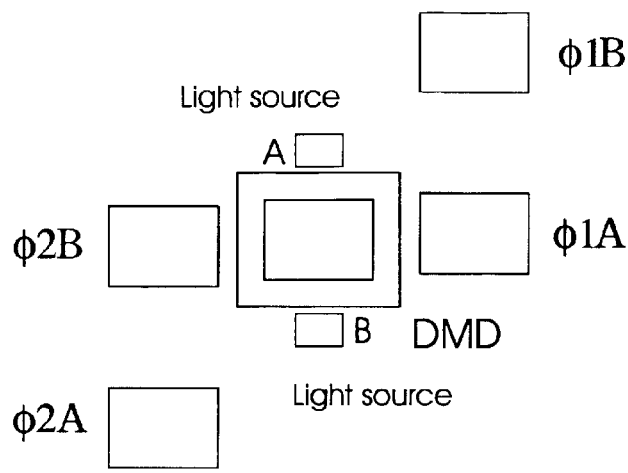
FIG. 5 is a plan view showing the relative placement of the micro-mirror array and the envelope of the resultant reflected light from the micro-mirror array in each of two mirror phases 1 and 2, which would result if two separate sources of illumination ("A" and "B") were vertically displaced about the center line of the micro-mirror array.
Figure 6:
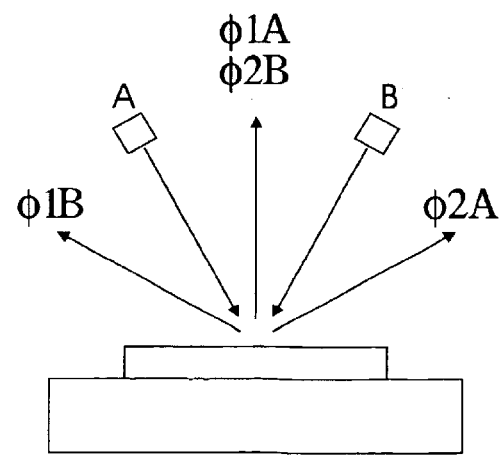
FIG. 6 is a side view showing the relative placement of the light sources and micro-mirror array and the path of the light to and from the micro-mirror array
Figure 7:
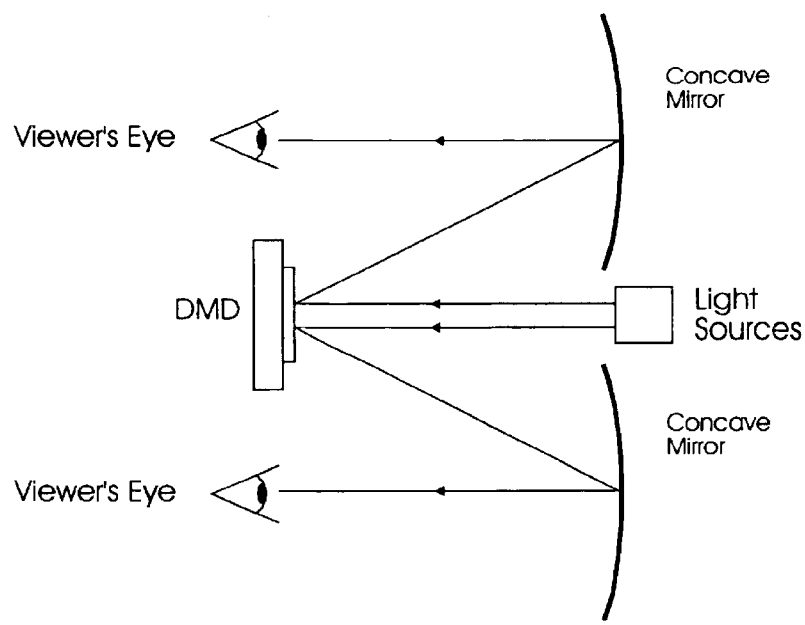
FIG. 7 is a plan view illustrating an arrangement of optical components utilizing a single concave mirror for each optical path to form a HMD, the "single stage embodiment."
Figure 8:
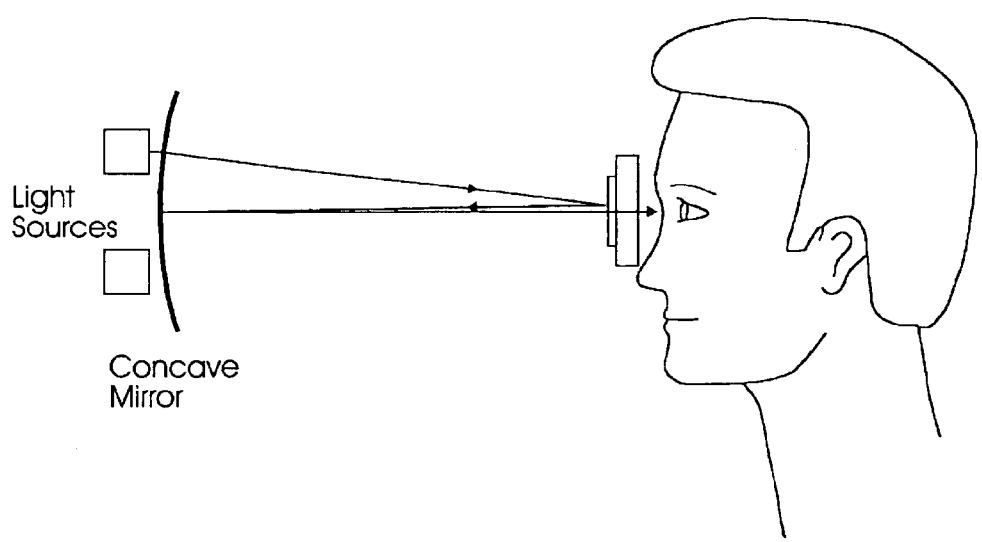
FIG. 8 is a side view showing an arrangement of optical components utilizing a single concave mirror for each optical path to form a HMD, the "single stage embodiment."

As the DMD chips are relatively expensive, reducing the requirement from two devices per HMD to a single device offers great advantages to the manufacturer. Several single chip DMD HMD designs are shown in FIGS. 7 to 14, 17 to 22, and 24. As can be seen in FIG. 4, by virtue of the diagonal hinge arrangement of the DMD the reflected image follows a line at substantially 45 degrees to the base of the DMD chip. As a result, the two image phases are vertically as well as laterally displaced. This can be advantageous because if two separate light sources (each containing the three primary colors) are positioned such that they are in the same vertical plane but displaced above and below the optical axis of the DMD as shown in FIGS. 5 and 6, then the resultant reflected images from the DMD will be such that a separate image from each light source will result in the same horizontal optical plane with its counterpart image being substantially displaced from the said horizontal optical plane. It then becomes possible by the correct synchronization and switching of the two light sources to produce two separate images that pass through separate optical components to the viewer's eyes. The resultant images will then be perceived by the viewer as originating at some distance outside of the HMD. Several different configurations of this design are shown in FIGS. 7 to 14, 17 to 22, and 24.

Figure 9:
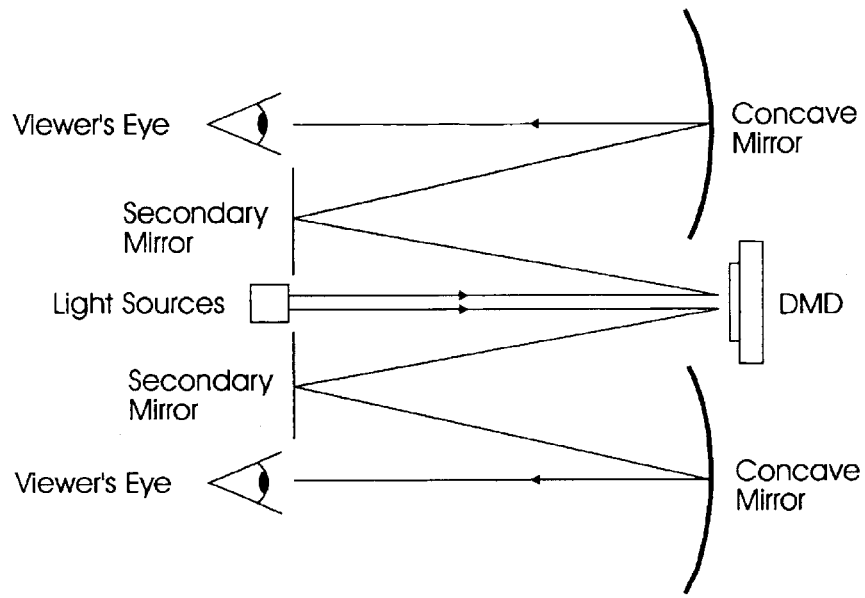
FIG. 9 is a plan view showing an arrangement of optical components utilizing a concave mirror and a plain mirror for each optical path to form a HMD, the "two stage embodiment."
Figure 10:
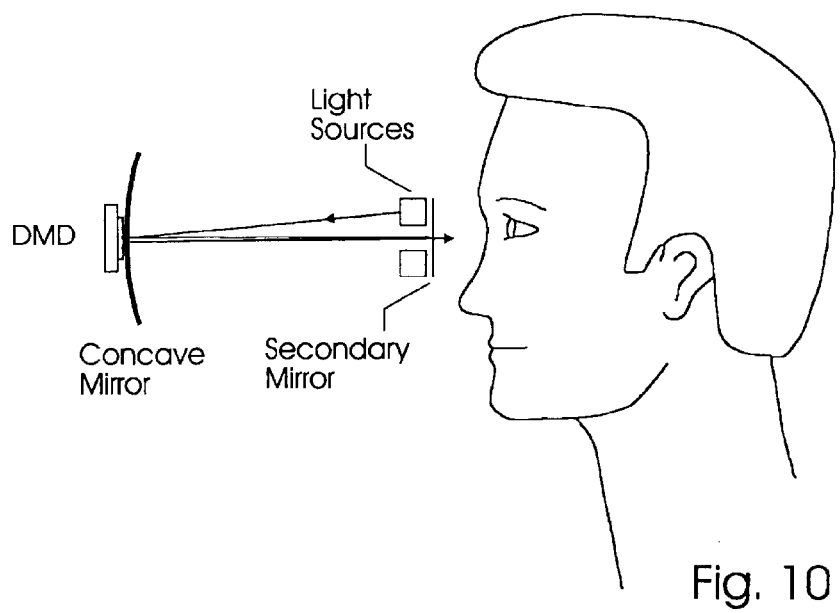
FIG. 10 is a side view showing an arrangement of optical components utilizing a concave mirror and a plain mirror for each optical path to form a HMD, the "two stage embodiment."
Figure 11:
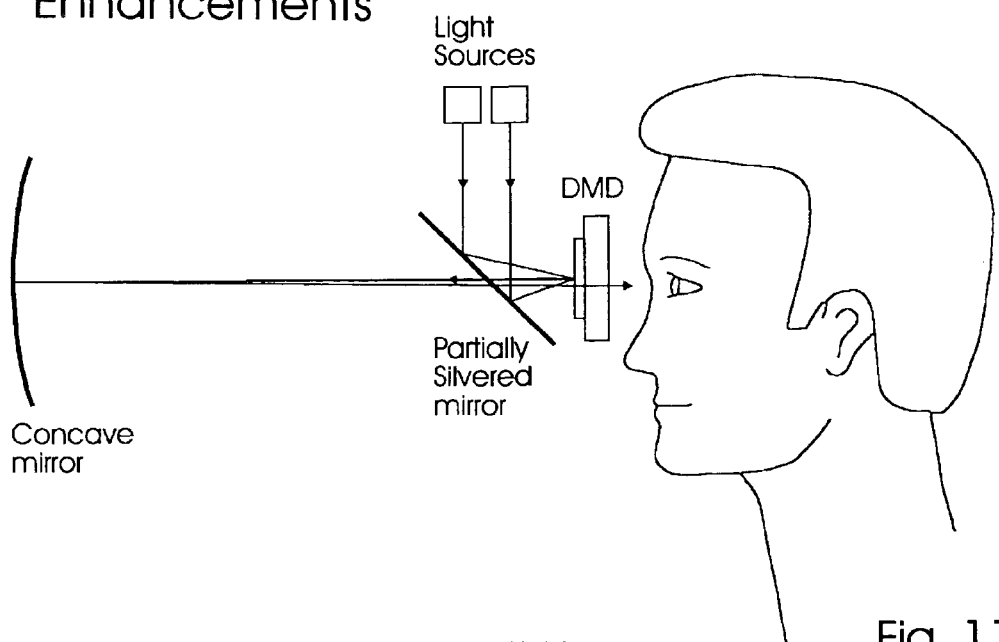
FIG. 11 is a side view showing a variation of the "single stage embodiment" design incorporating a partially silvered mirror to reduce the overall size of the assembly.
Figure 12:
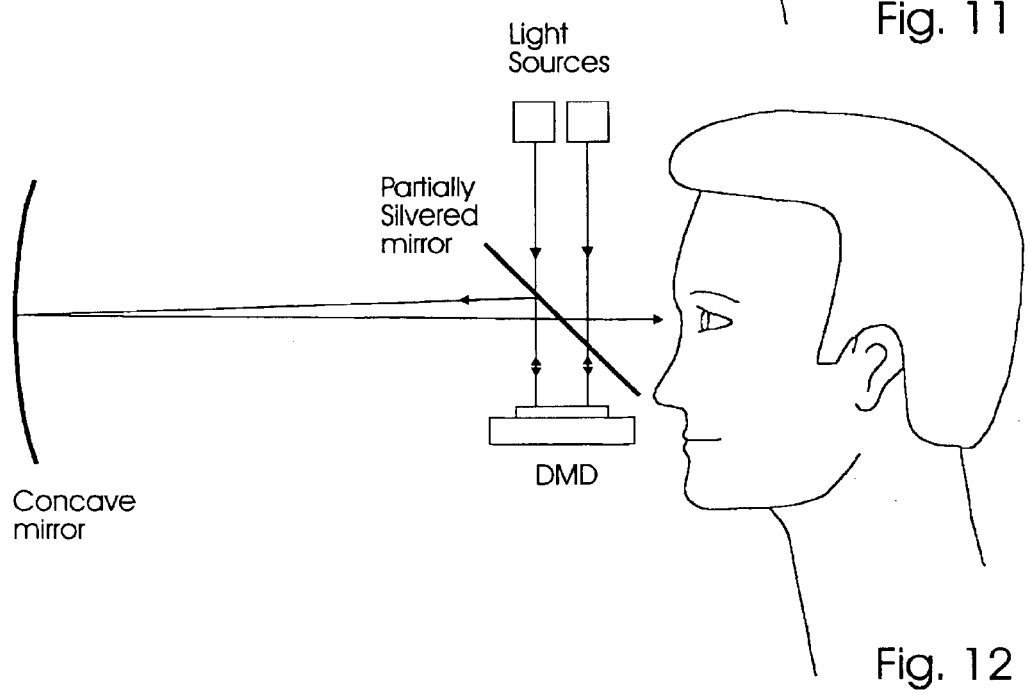
FIG. 12 is a side view showing a further variation of the "single stage embodiment" design incorporating a partially silvered mirror to reduce the overall size of the assembly.
Figure 13:
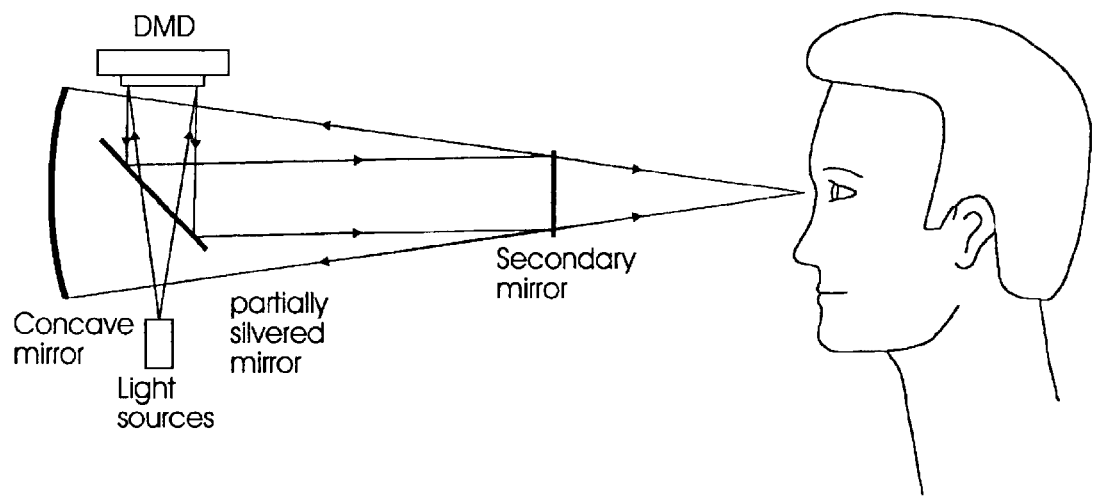
FIG. 13 is a side view showing a variation of the "two stage embodiment" design incorporating a partially silvered mirror to reduce the overall size of the assembly.
Figure 14:
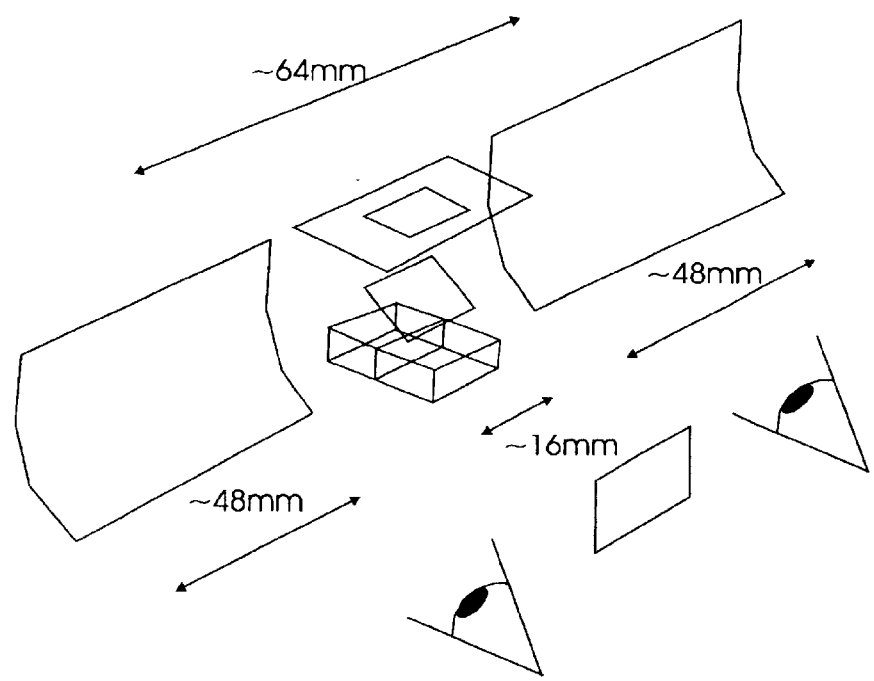
FIG. 14 is an isometric view of the embodiment shown in FIG. 13.
Figure 15:
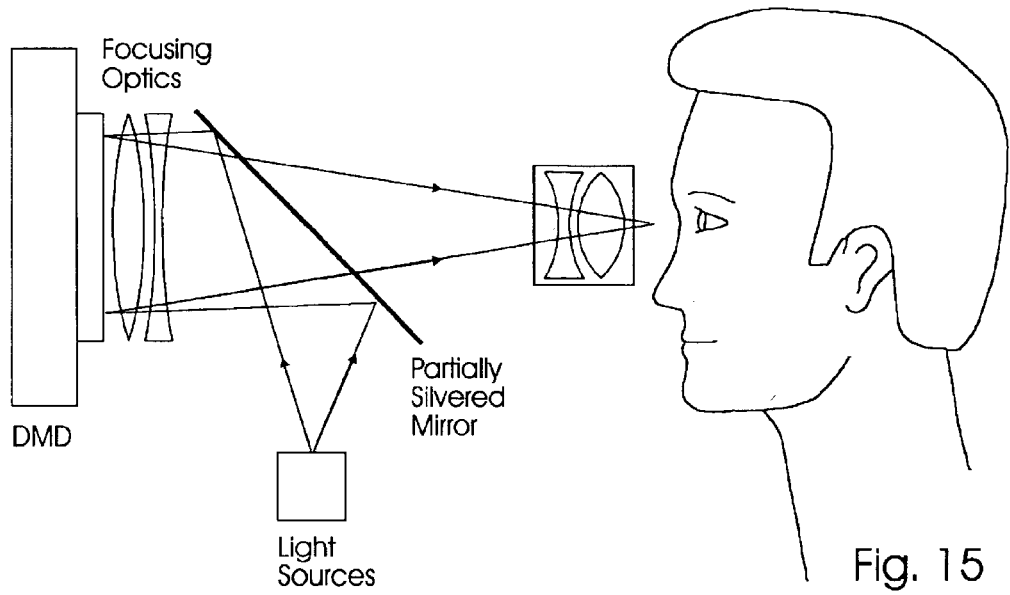
FIG. 15 is a side view showing an arrangement of optical components utilizing a micro-mirror array in conjunction with a partially silvered mirror, focusing lens assembly, and eyepiece lens assembly to produce a single image display system, a "dual DMD lens system embodiment."
Figure 16:
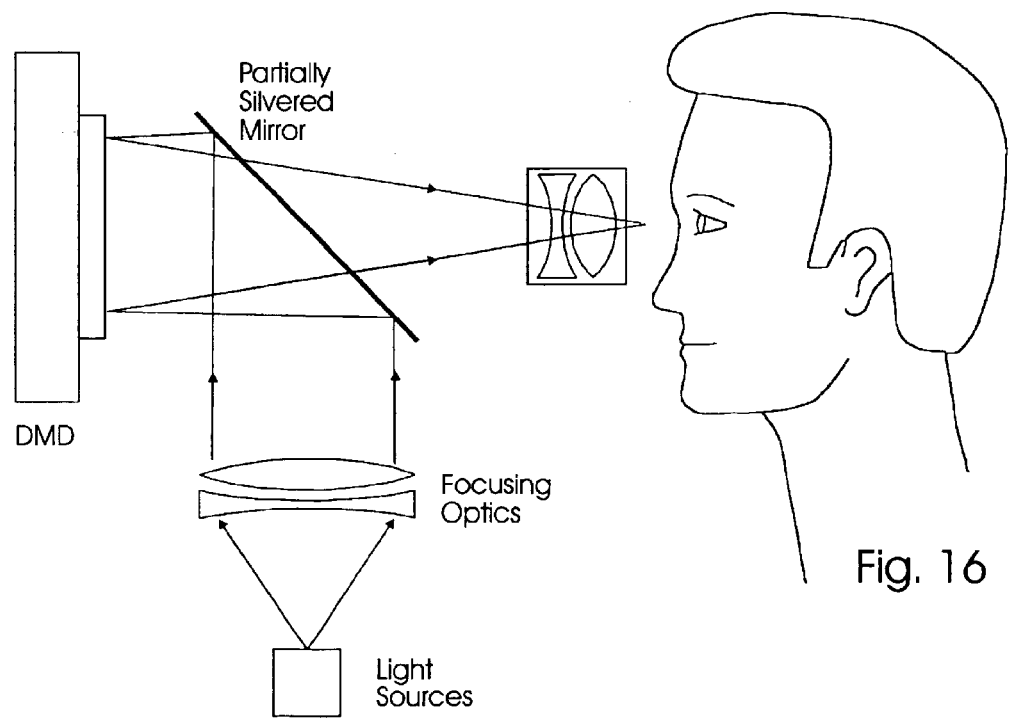
FIG. 16 is a side view showing a variation of the "dual DMD lens system embodiment" design.

The basic design of a mirror HMD relies on a light source bouncing light directly off the DMD. The reflected light then strikes a concave mirror either directly or by first bouncing off one or more plain mirrors. The concave mirror can be either totally or partially silvered. If a partially silvered mirror is utilized it is possible to overlay the virtual graphics over the real world. This technique is not possible with a simple lens based system because the two images have different focal distances. In all cases, the final image is viewed directly from the concave mirror. These designs are outlined in FIGS. 7 to 14. Most of the illustrations show variations designed to make the HMD more compact. This is an important consideration because the horizontal deviation angle of the two reflected images (phase 1A, phase 2B) as shown in FIG. 5 is relatively small (approximately 14 degrees). As a result the required distance for the two reflected images (phase 1A, phase 2B) to separate the required 65 mm (average inter-ocular displacement) is relatively long. As can be seen in FIG. 9 the introduction of an additional plane mirror/mirrors reduces this distance to half. The enhancements shown in FIGS. 11 and 12 are aimed at reducing the obstruction to the viewer eyes and removing a spatial conflict between the light sources and the DMD. The optimal embodiment of the mirror HMD is shown in FIG. 14. The utilization of the partially silvered mirror in the configuration shown in FIG. 14 makes the HMD more compact and makes possible the use of larger light sources which in turn enlarge the size of the region within which the viewer can effectively see a clear image (i.e. larger inter-ocular acceptance region).

Figure 17:
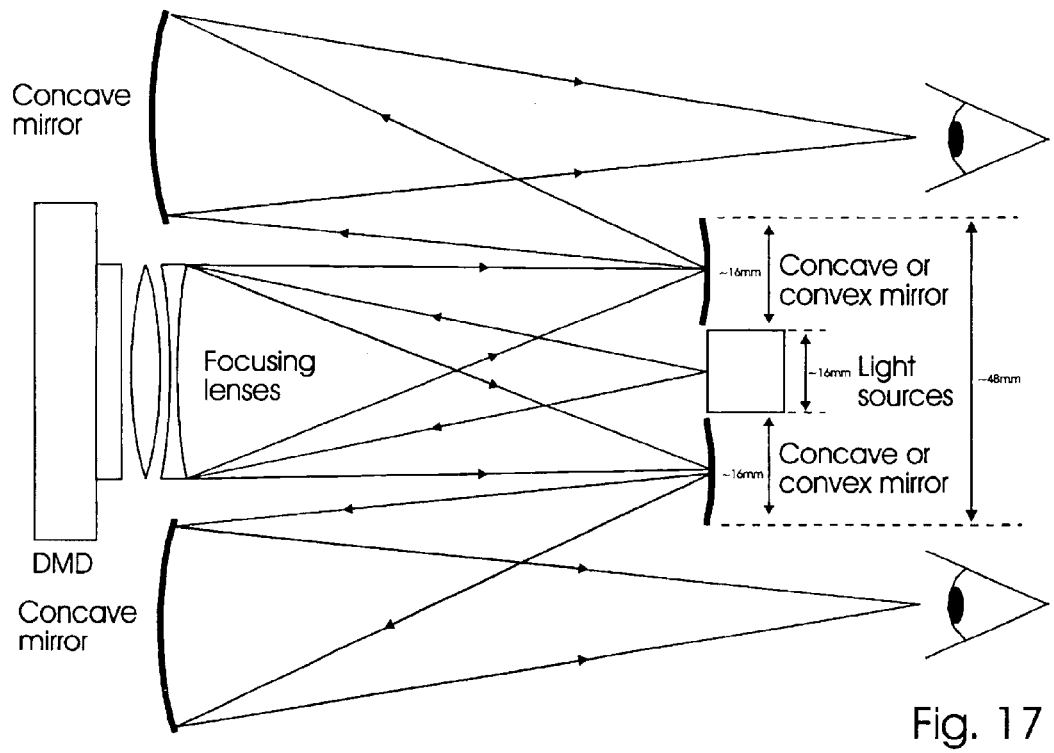
FIG. 17 is a plan view showing a variation of the "two stage embodiment" design, utilizing a concave mirror and a secondary concave or convex mirror for each optical path to form a HMD, a "2 stage dual mirror hybrid embodiment."

The 2-stage dual mirror hybrid HMD shown in FIG. 17 is a combination of lens and mirror technologies. This design overcomes a size requirement problem of the secondary mirror that is encountered with the two stage mirror designs of FIGS. 9, 10, 13, and 14. However, the introduction of the second set of curved mirrors may introduce additional optical distortion.

The mirror design HMDs have other advantages in addition to reducing the number of required DMD chips to one per HMD. The first is that mirrors do not suffer from chromatic aberration as do single element lenses and although more complex lenses such as achromatic doublets can significantly overcome these problems they then become at least moderately expensive items that add to the cost of the overall system. In addition, it has been found that the proximity of the lens to the viewer's eye causes significant problems such as fogging of the optics (due to moisture from the viewer's eyes and face). This problem has not been found to be significant when mirrors are used, due to the greater distance between the viewer's eyes and the mirror surface. This greater proximity may also have significant safety implications to the eyes of the viewer if the HMDs are to be used in environments where there is a risk of the operator falling or the occurrence of a collision between the HMD and another object.

Although optimal in many regards, the mirror designs do have the disadvantage that they tend to be bulkier than a more conventional lens based optical design. In addition it is more difficult to attain a wide viewing angle with mirror based designs than it is with the lens based designs. Then at the sacrifice of these problems I have outlined the basic design of several configurations of lens based HMDs. These are shown in FIGS. 15, 16, and 18 to 24. The designs shown in FIGS. 15, 16, and 23 require two DMD chips per HMD. However, those shown in FIGS. 18 to 22 and 24 produce two separate images from a single DMD as in the mirror designs. The dual DMD designs tend to be more compact but image quality and viewing angle are similar for both designs.

The hybrid HMD designs as shown in FIGS. 15, 17, and 20 to 24 utilize a focusing lens (or lens combination) positioned directly in front of the DMD to bring the reflected light from the DMD to a focus point. This has the advantage of reducing the required size of the secondary mirror (in the case of the design shown in FIG. 17) or focusing lens (in the case of the design shown in FIGS. 21 to 23). In the case of the design shown in FIG. 15, these focusing optics serve to reduce the size requirement of the eyepiece. In the case of the design shown in FIG. 19, this focusing lens has been replaced by a concave mirror. Although this has the advantage of removing any possibility of chromatic aberration it produces a configuration that is not as compact as that utilizing lenses.

Figure 18:
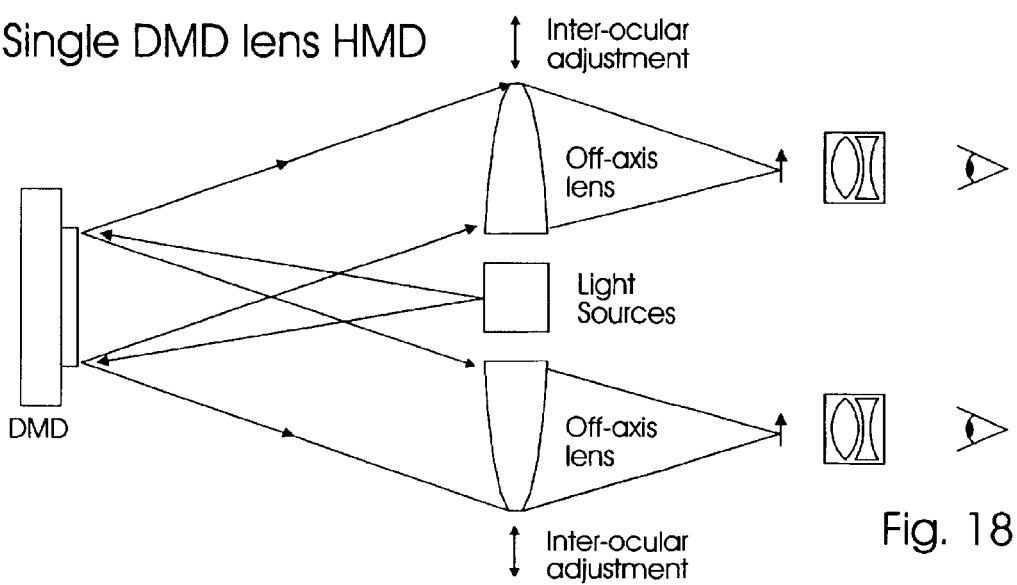
FIG. 18 is a plan view showing an arrangement of optical components utilizing an off-axis lens element for each optical path to form a HMD, a "single DMD lens embodiment."
Figure 19:
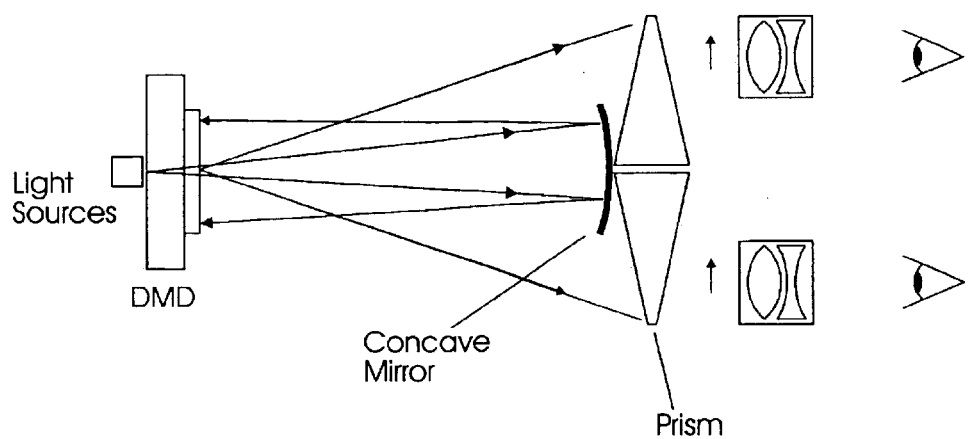
FIG. 19 is a plan view showing an arrangement of optical components utilizing a single concave mirror element and two separate wedge prisms to form a HMD, a "prismatic lens embodiment."
Figure 20:
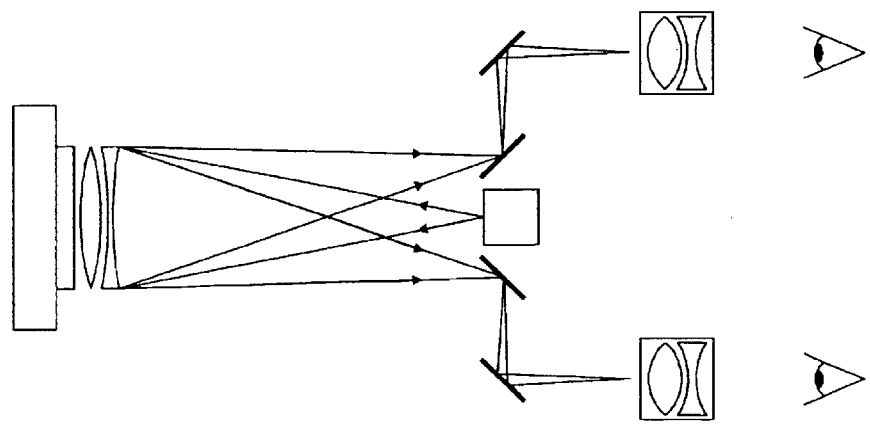
FIG. 20 is a plan view showing an arrangement of optical components utilizing a pair of reflective surfaces for each optical path to widen the displacement between the optical axes of the two resultant images "a binocular lens embodiment"
Figure 21:
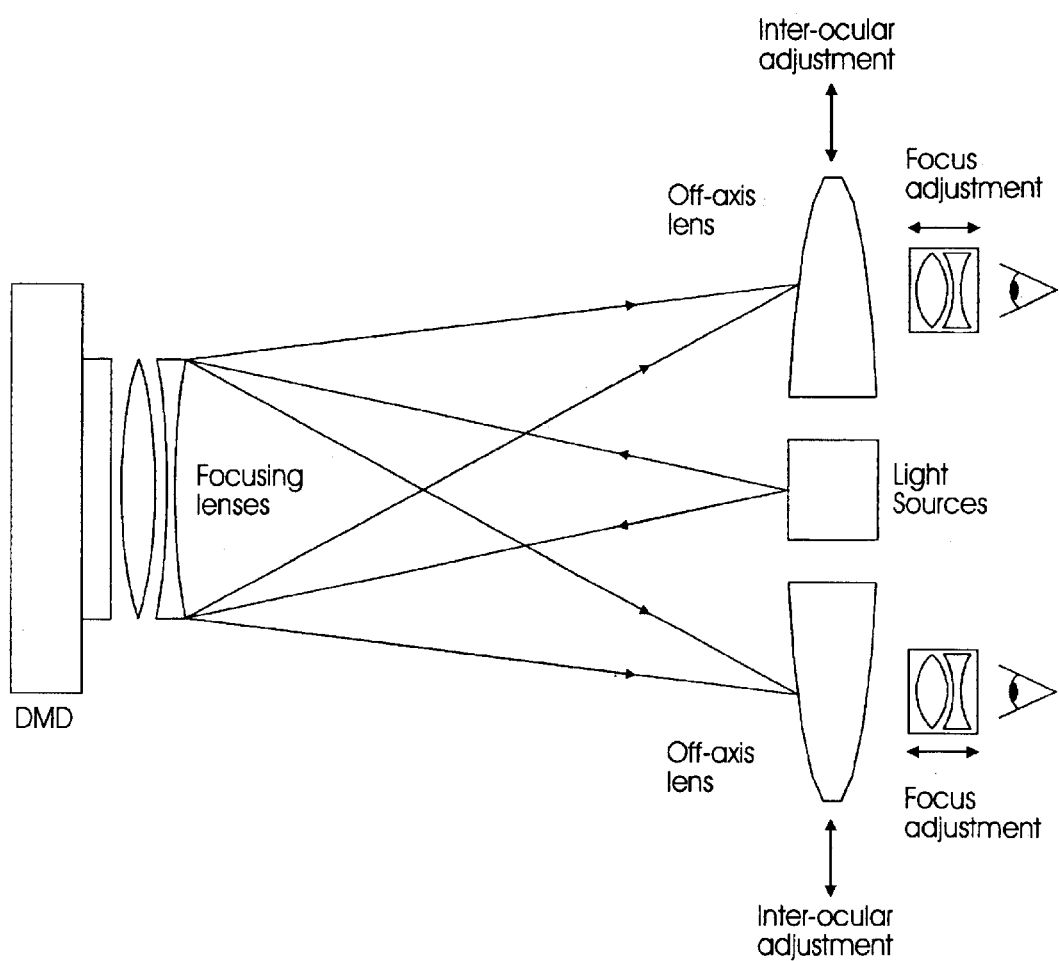
FIG. 21 is a plan view showing a variation of the "single DMD lens embodiment" design, utilizing a focusing lens assembly in addition to an off-axis lens element for each optical path to form a HMD, a. "single stage hybrid lens embodiment."
Figure 22:
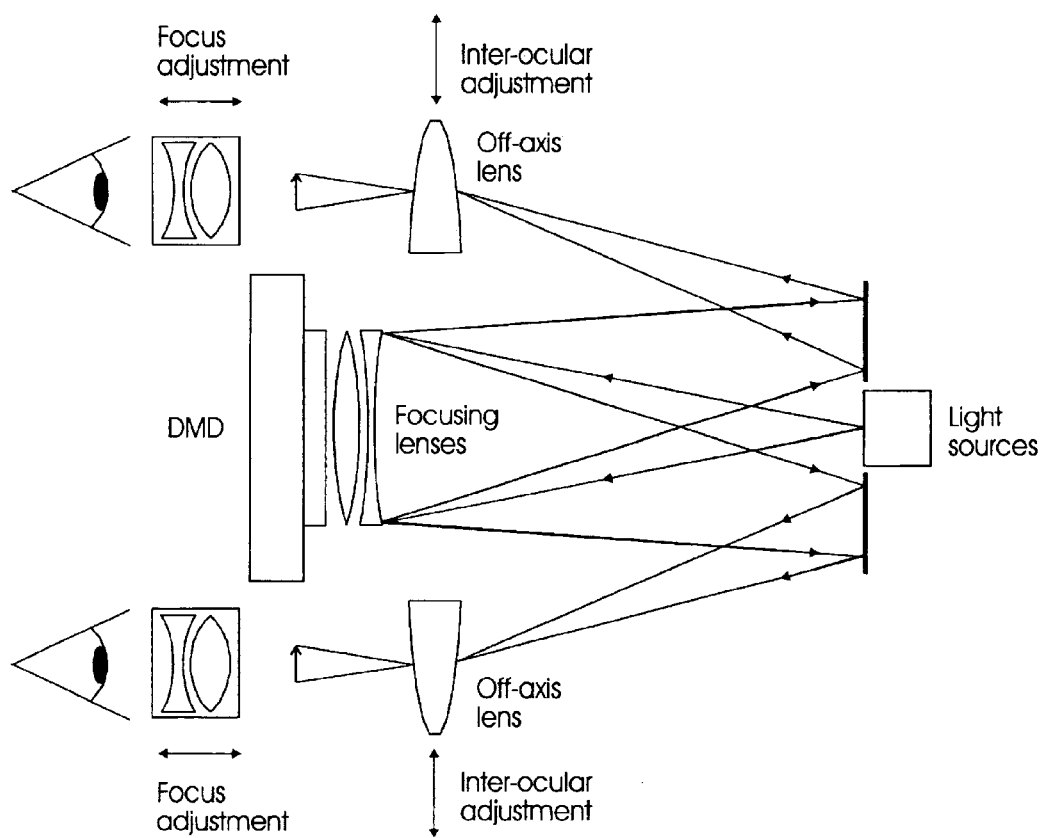
FIG. 22 is a plan view showing a variation of the "single stage hybrid lens embodiment" design, utilizing a secondary mirror for each optical path to reduce the size of the overall HMD, a "two stage hybrid lens embodiment"

One of the disadvantages of a lens based design is the requirement for inter-ocular adjustment. However as shown in FIGS. 18, 21, and 22 this can be readily implemented by adjusting the spacing between the off-axis focusing lenses in a plane substantially perpendicular to the optical axis of the focused light. It should be noted that the focusing lenses have a preferred design which has the optical axis of the lens shifted towards the inner edge of the lens as shown in FIGS. 18, 21, and 22. This has the added effect of altering the center line of the focused light from a diverging angle to a substantially parallel line. This is a requirement to reduce eye strain; i.e., ideally, the viewer should perceive the image as originating from some distance in front of the HMD, in which the light rays from a distant object will be substantially parallel upon entering the viewer's eyes.

Figure 23:
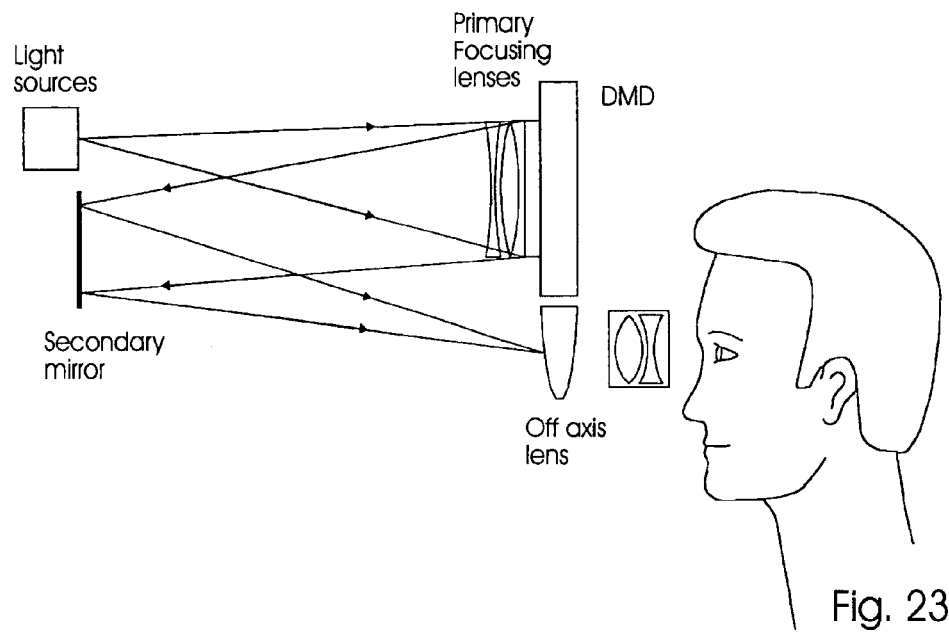
FIG. 23 is a side view showing a variation of the "two stage hybrid lens embodiment" design, for the generation of a single image from each DMD.
Figure 24:
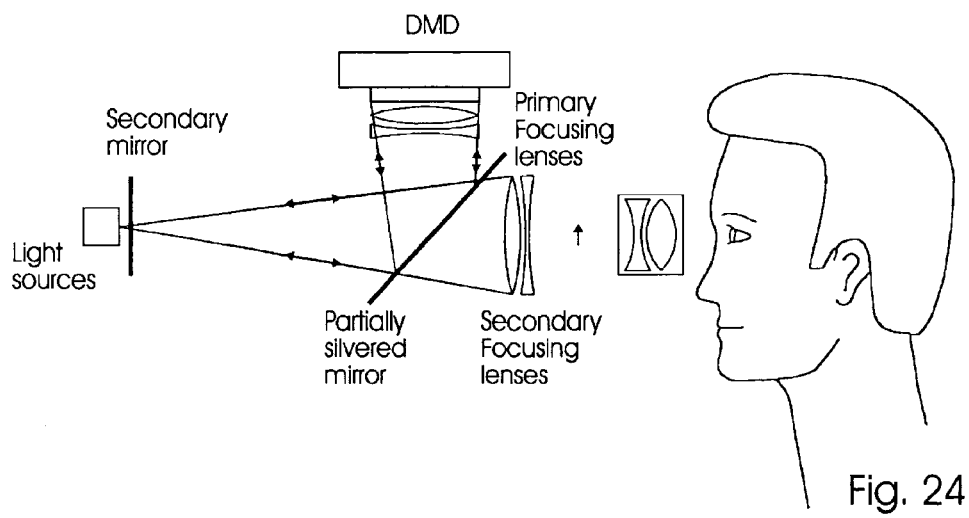
FIG. 24 is a side view showing an arrangement of optical components utilizing a secondary focusing lens assembly and mirror for each optical path in addition to a common partially silvered mirror and DMD to form a HMD.
Figure 25:
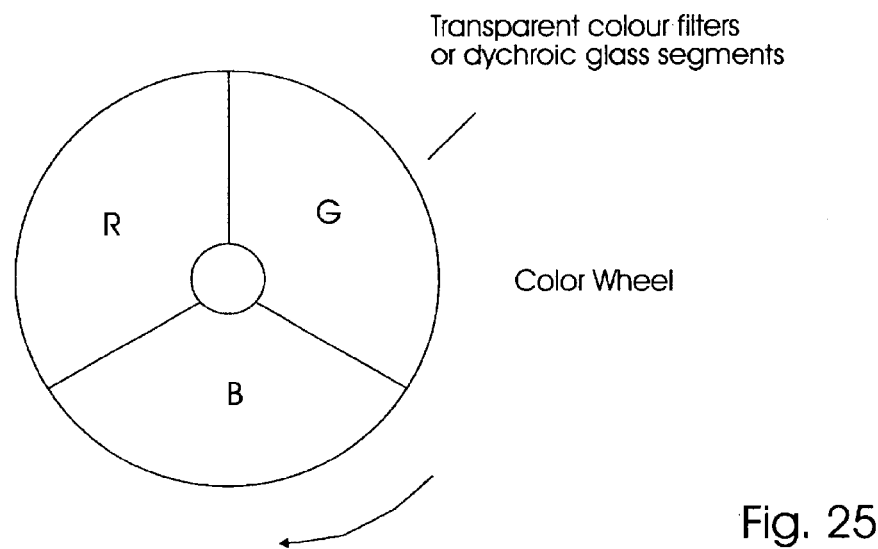
FIG. 25 is a front view showing the layout of a disk of colored transparent material for the purpose of producing a projected colored light from a white light source.
Figure 26:
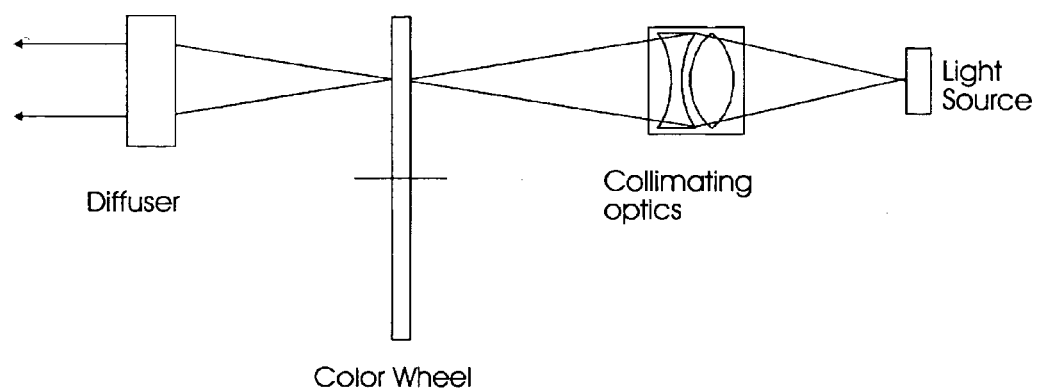
FIG. 26 is a side view showing an arrangement of optical components utilizing a wheel of colored transparent material, a white light source, collimating optics and an optical diffuser for the purpose of producing a projected colored light from a white light source.
Figure 27:
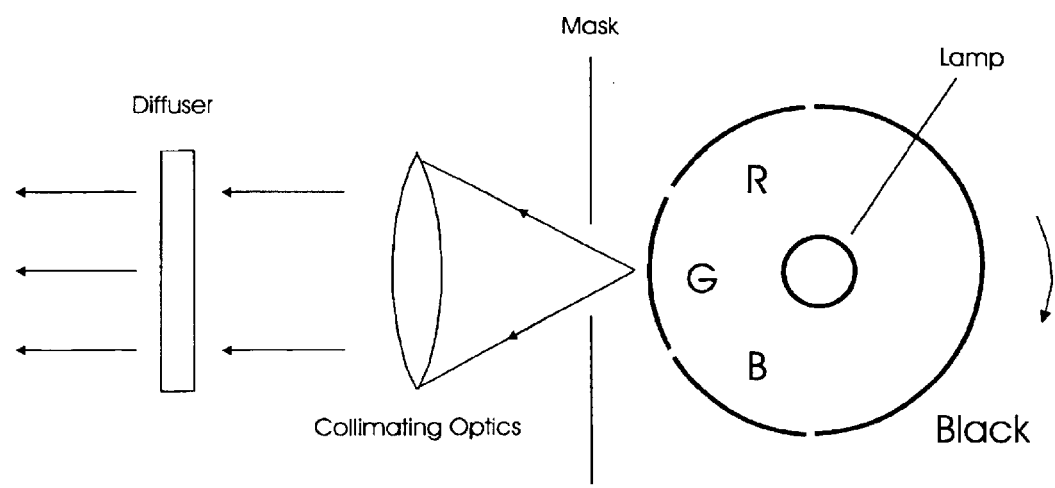
FIG. 27 is a side view showing an arrangement of optical components utilizing a cylinder of colored transparent material, a cylindrical white light source, collimating optics, an optical mask and an optical diffuser for the purpose of producing 1 or more projected colored light sources from a single white light source.
Figure 28:
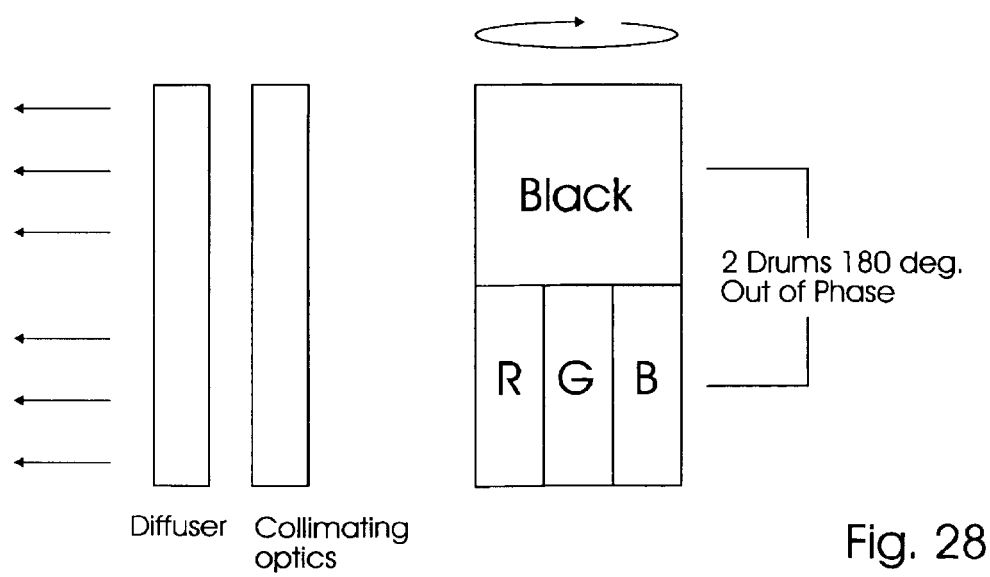
FIG. 28 is a plan view showing an arrangement of optical components utilizing a cylinder of colored transparent material, a cylindrical white light source, collimating optics, an optical mask, and an optical diffuser for the purpose of producing 1 or more projected colored light sources from a single white light source.
Figure 29:
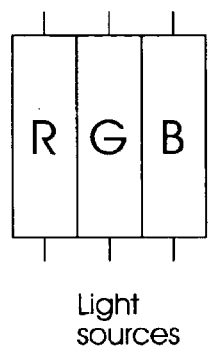
FIG. 29A is a front view showing the layout of three red, green, and blue colored light sources.
FIG. 29B is a side view of the layout of FIG. 29A, highlighting the additional optical diffuser for the purpose of producing a projected source of colored light
Figure 29:
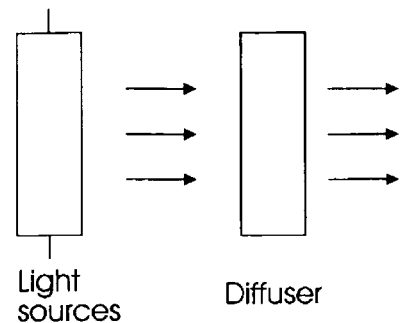

The lens HMD enhancements shown in FIGS. 23 and 24 are concerned with removing the viewing obstruction produced by the DMD. Although in later designs this may become a serious consideration, the present DMDs are sufficiently compact to produce a practical HMD utilizing the design shown in FIG. 22.

Figure 30:
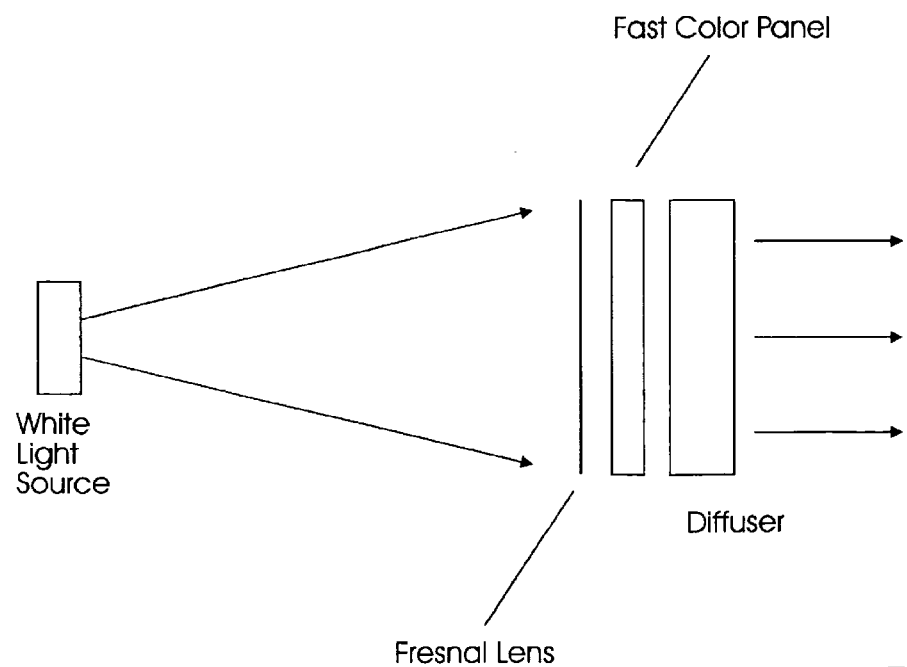
FIG. 30 is a side view showing a layout of optical components utilizing an electrically controlled color filter in addition to a fresnal lens and optical diffuser for the purpose of producing a projected source of colored light.
Figure 31:
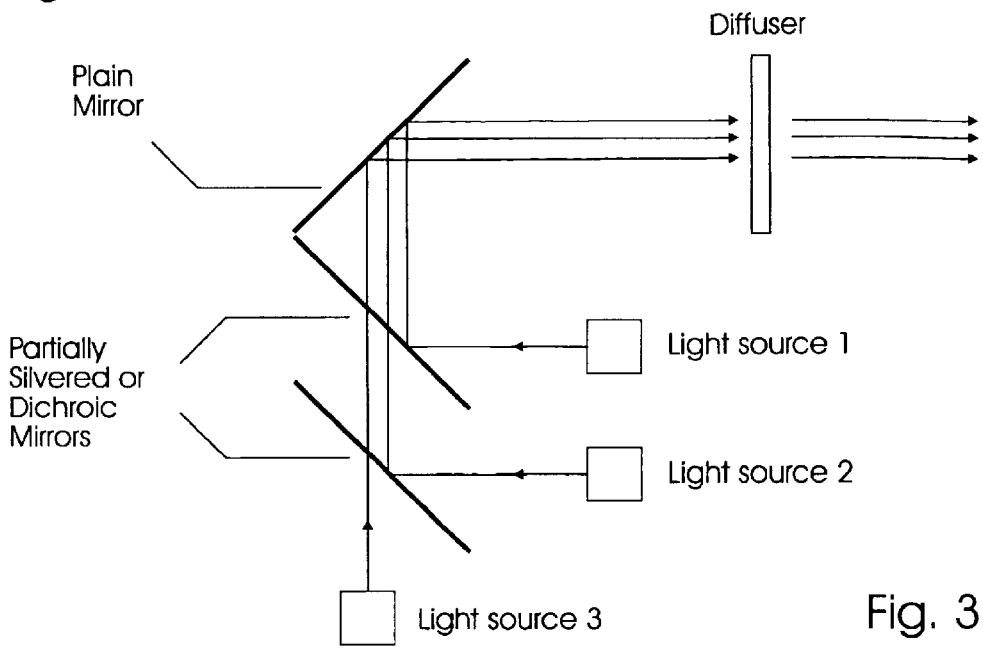
FIG. 31 is a side view showing a layout of optical components utilizing a series of partially silvered mirrors or dichroic mirrors to combine three different light sources projecting red, green, and blue light for the purpose of producing a co-axial projected source of colored light.
Figure 32:
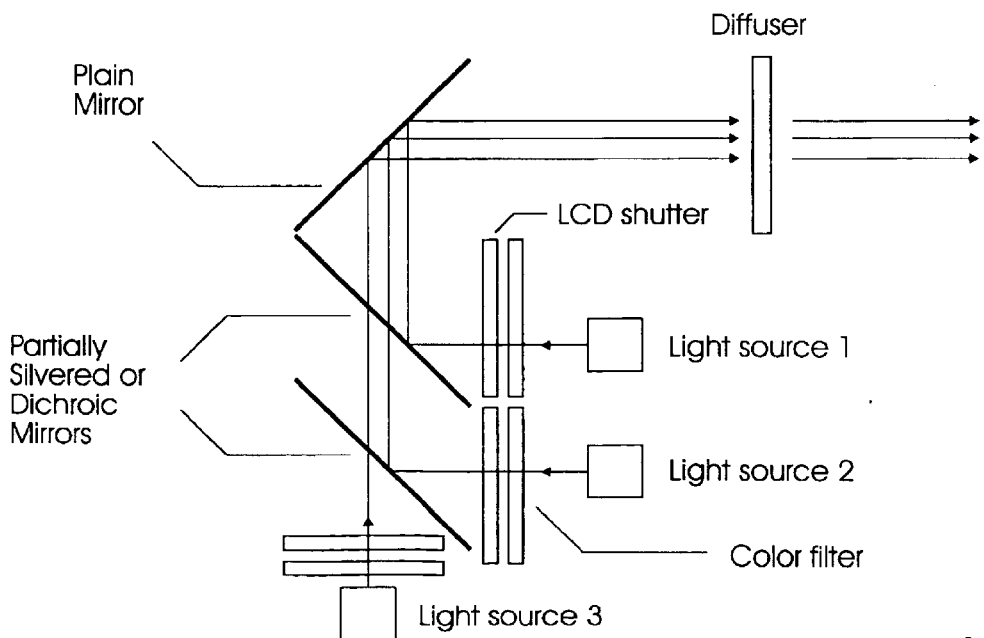
FIG. 32 is a side elevation showing a layout of optical components utilizing a series of partially silvered mirrors or dichroic mirrors in conjunction with color filters and fast electronic shutters to produce and combine three different light sources projecting red, green, and blue light for the purpose of producing a co-axial projected source of colored light.
Figure 33:
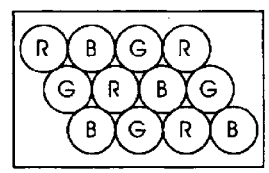
FIG. 33A is a front view showing the layout of an array of LED or other emmisive colored light sources.
FIG. 33B is a side view of the layout of FIG. 33A, highlighting the additional optical diffuser for the purpose of producing a projected source of colored light
Figure 33:
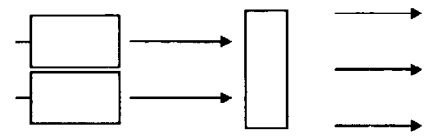
Figure 34:
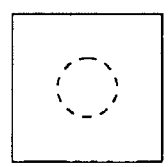
FIG. 34A is a front view showing the layout of a single light source capable of producing either red, green, or blue light.
FIG. 34B is a side view of the layout of FIG. 34A, highlighting the additional optical diffuser for the purpose of producing a projected source of colored light.
Figure 34:
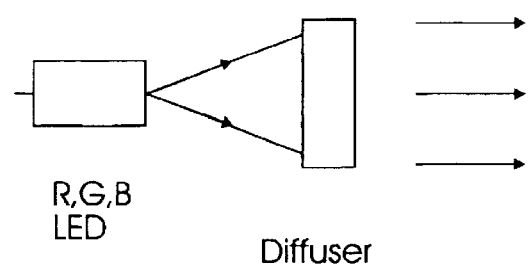

The light source used in conjunction with the DMD is a vital component of the overall display system. It must be capable of producing the three primary colors of light (green, blue and red or orange) with both high purity and also have the ability to switch rapidly between them. LED and LASER light sources are ideal as they both produce very pure light and also have very fast switching times. Of the two, LEDs are the preferred option as they are more compact and are simpler to drive than LASERs. The only disadvantage with the use of LEDs is that the overall radiant light output is relatively low in comparison to other more conventional light sources such as tungsten filament lamps. It is possible to utilize such older technologies (like halogen and krypton lamps) if appropriately colored filters or dichroic filters are placed in the optical path. Such filters can be either dynamic (in the form of a color wheel or cylinder) as shown in FIGS. 25 to 28 or static as shown in FIG. 32 and used in conjunction with other switching elements such as high speed LCD shutters (such as ferro-electric shutters) In addition to these configurations it is possible to utilize fast response color LCD panels to act as a programmable filter, as shown in FIG. 30. There are many other potential filter configurations that are known to those skilled in the field. In addition to the use of filament type light sources there are several types of gas discharge lamps that can be used to good effect. These can have either color phosphors with the appropriate primary colors or can produce white light and be fitted with color filters of the appropriate colors. The advantages of these type of lamps is that they have fast response times and can be rapidly switched. The disadvantages are that they generally require high voltages and are significantly bulkier than a corresponding solid state lamp such as a LED.

It should be noted that although the light sources are depicted in the illustrations as being point sources, it is in fact favorable for the sources of light to have a finite size. The reason for this design detail is evident if one follows the path of the light rays through the optical components to the viewer's eye. In the case of the mirror design, the curvature of the concave mirrors are chosen such that light from the light source (assume a point source for simplicity) will come to a focus at the viewer's eyes. This is a requirement for consistency of the image brightness because, unlike a diffusely illuminated object, each point on the DMD is illuminated by only a single ray of light from the light source. Thus for the image to be viewable in its entirety, every ray of light that reflects off the DMD surface must enter the eye of the viewer. As the pupil of the viewer is only in the order of 5 mm, this is only possible if the light rays all come to a focus at the viewer's eye. The disadvantage of this focusing of the light is that if the viewer's eye is not positioned exactly at the focus point then the image will not be viewable in it's entirety. This problem is easily solvable by making the light source of a finite size. This finite size light source can be thought of as a cluster of tightly packed point light sources each generating a pattern of light rays that come to a focus point in a slightly different location. Thus, if this "diffuse" light source is used, the entire image will be viewable at a number of points which will themselves form a pattern of identical shape as the light source but whose size is the inverse of the magnification factor of the mirror assembly; i.e., (size of the viewable region)=(size of light source)*(distance between mirror and focus point of the light source)/(distance between light source and mirror). The size of the light sources can be increased with a corresponding improvement in the size of the viewable region until the resultant reflected images as shown in FIG. 5 begin to overlap at which point the DMD will be unable to switch the incident light correctly. Therefore, it should be possible, with the correct optical design to generate a HMD which has such a wide viewable region that there is no requirement for inter-ocular adjustment (i.e. adjustment for the spacing between the eyes). This feature would make the HMD significantly easier to configure for an unknown viewer, a particularly important feature for use in the public entertainment industry.

Figure 36:
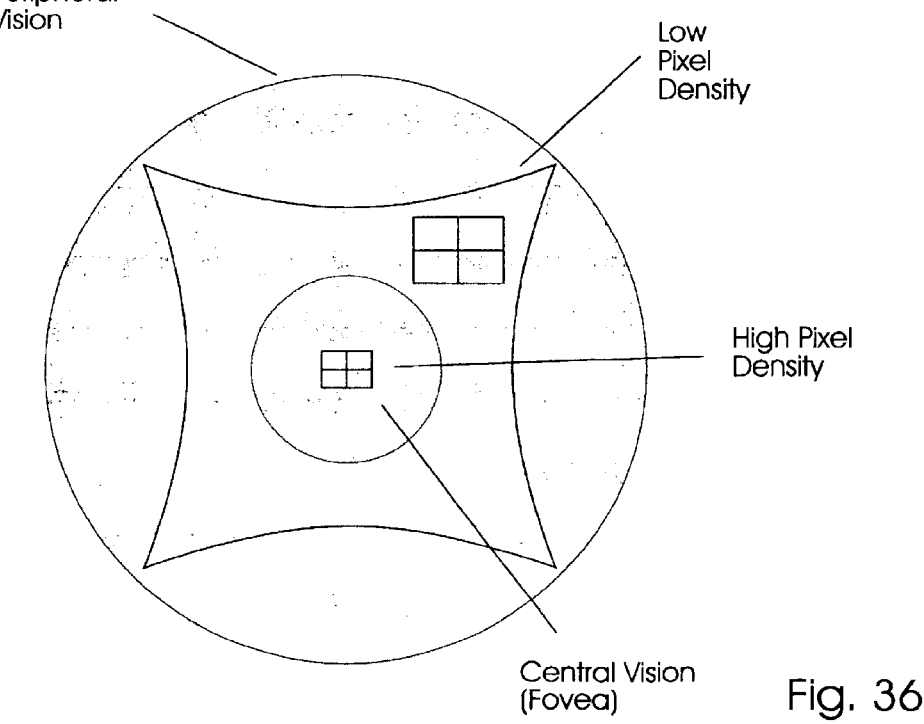
FIG. 36 is a diagram showing the field of view of a person's eye, indicating the fovea and highlighting the effect of introducing optical distortion into the projected image so as to achieve variable pixel size across the person's field of view.
Figure 37:
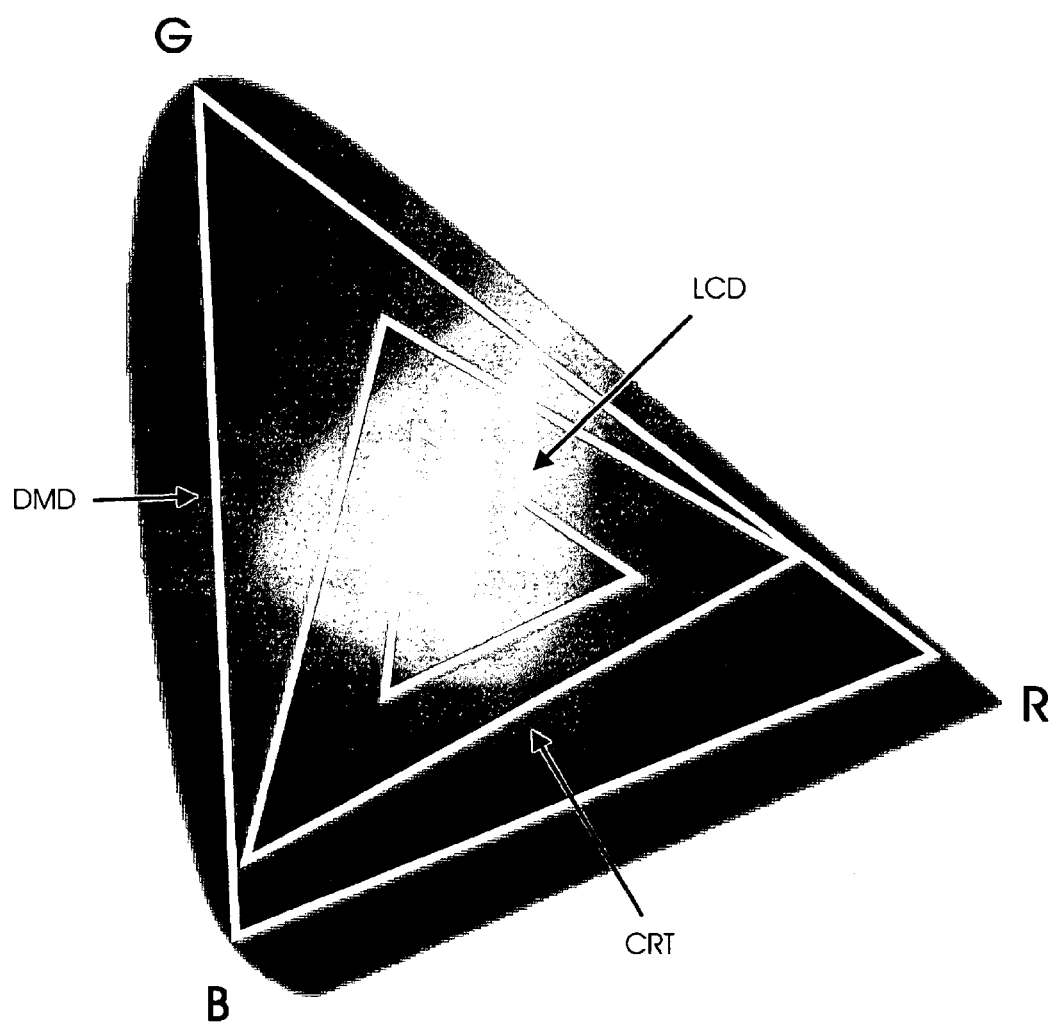
FIG. 37 is a diagram showing the color space envelope of various different display technologies, indicating the improved color saturation possible with DMM technology.

In addition to the improved resolution of the DMD over LCD technology, there are also a number of optical techniques that can be employed which will improve the apparent resolution of the HMD. The first of these is to introduce pin-cushion distortion into the image. The result of this distortion is to cause the pixels in the center of the image to be stacked more closely together than those at the periphery of the image, see FIG. 36. This uneven distribution of resolution mimics the distribution of image sensors in the retina of the eye. The center region of the eye (fovea) contains the highest density of cones (color image sensors) the surrounding area contains less cones and more rods (B/W image sensors) These rods are generally responsible for peripheral vision at a lower resolution and the cones are responsible for high resolution color imaging. Thus it is possible, by virtue of this pin-cushion distortion, to improve the apparent overall resolution of the HMD. This distortion can be introduced optically by altering the curvature of the mirrors or lenses used in the system. It should be noted however that in addition to altering the pixel density, this optical distortion also distorts the image significantly. Thus, it is necessary to provide a counter distortion (barrel distortion) electronically to the images prior to their generation. These distortions can be generated in real-time by digital processing means. The techniques for which are known to those skilled in the field.

Figure 35:
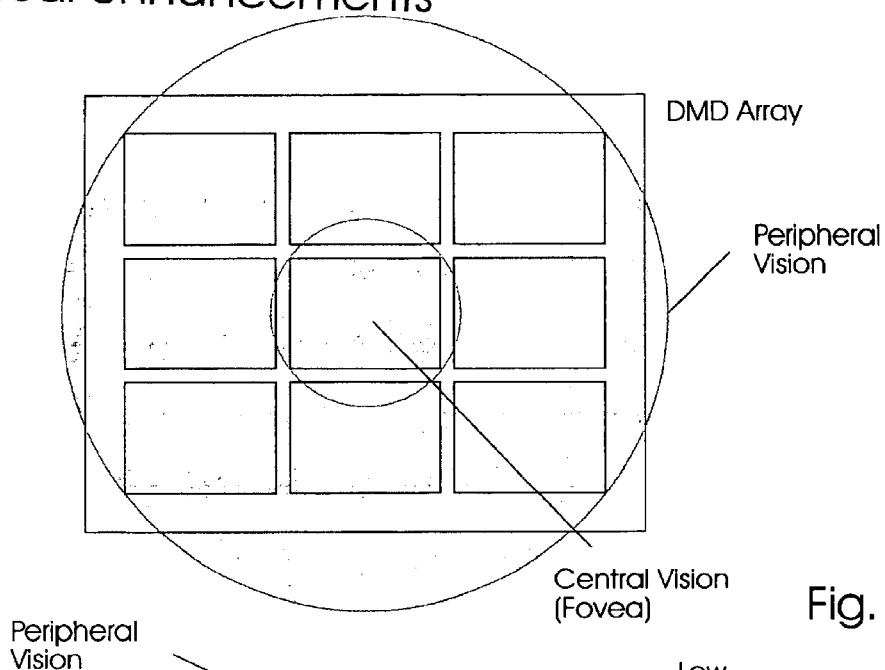
FIG. 35 is a diagram showing one possible physical layout of display devices in relation to the field of view of a person's eye and showing the relative location of the fovea so as to stimulate the peripheral vision as well as providing high resolution "center field images."

A second technique that can be employed to improve the apparent image resolution is to produce several different image fields. A central image field (usually at high resolution) and one or more secondary image fields at the same or lower resolution. This array of multiple fields can be achieved by either compositing the images optically (by using a partially silvered mirror or other means or by utilizing an family of DMM arrays as shown in FIG. 35. The incorporation of multiple micro-mirror arrays on a single chip is a proven fabrication technique. The only drawback to this technique is that there are small discontinuities produced between the arrays. This will not be a problem for this application as these image discontinuities fall outside the central image region and are thus not particularly noticeable to the viewer.

It should be noted that wherever concave mirrors are utilized in the HMD design these can be replaced by a combination of a plain mirror and a Fresnel lens. This combination is functionally identical but is not the preferred embodiment because it introduces chromatic aberrations and other Fresnel artifacts to the image (such as shadow lines at the border of each lenslet). Additionally, when achromatic doublets are shown in the diagrams these are functionally interchangeable with single element lenses, other combinations of lenses or Fresnel lenses, although the use of achromatic doublets is the preferred implementation.

What is claimed is:

1. A compact lightweight display device comprising
   (A) a single digital micro-mirror device that comprises a multiplicity of individually electronically controlled mirrors, where each mirror has a first position and a second position;
   (B) at least one light source for projecting light onto said digital micro-mirror display device;
   (C) means for transmitting light from the first said light source that is reflected by the micro-mirrors in said first position into an eye of a person viewing said display device; and
   (D) an optional means for transmitting light from the second said light source that is reflected by the micro-mirrors in said second position into the other eye of a person viewing said display device.

2. A display device according to claim 1 wherein there is a first light source and a second light source and light from said first light source that is reflected by the micro-mirrors that are in said first position is transmitted into one eye of a person viewing said display device and light from said second light source that is reflected by the micro-mirrors that are in said second position is transmitted into the other eye of a person viewing said display device.

3. A display device according to claim 1 wherein said light source projects white light.

4. A display device according to claim 1 wherein said light source projects three optical primary colors in succession.

5. A display device according to claim 1 wherein a pair of concave mirrors focuses and directs said light into the eyes of a viewer to produce two separate images.

6. A display device according to claim 1 wherein a series of plane and concave mirrors focuses and directs said light into the eyes of a viewer to produce two separate images.

7. A display device according to claim 1 wherein a series of plane mirrors and lenses focuses and directs said light into the eyes of a viewer to produce two separate images.

8. A display device according to claim 1 wherein a series of lenses focuses and directs said light into the eyes of a viewer to produce two separate images.

9. A display device according to claim 1 wherein two off-axis focusing lenses focus and direct the light into a pair of eyepieces and subsequently into the eyes of a viewer to produce two separate images.

10. A display device according to claim 1 wherein at least one lens directly in front of and on the same optical axis as said digital micro-mirror device focuses light from said light sources to a pair of focus points where it is reflected from at least one mirror onto at least one concave mirror and then into the eyes of a viewer.

11. A display device according to claim 1 wherein at least one lens directly in front of and on the same optical axis as said digital micro-mirror device focuses light from said light sources to a pair of off-axis focusing lenses, which in turn focus and direct said light to a pair of eyepieces and subsequently into the eyes of a viewer to produce two separate images.

12. A display device according to claim 1 wherein at least one lens directly in front of and on the same optical axis as said digital micro-mirror device focuses light from said light sources to a pair of focus points where said light is reflected from at least one mirror onto a pair of off-axis focusing lenses which in turn focus and direct said light to a pair of eyepieces and subsequently into the eyes of a viewer to produce two separate images.

13. A display device according to claim 11 that incorporates a mechanism to adjust the spacing between said off-axis focusing lenses to achieve inter-ocular adjustment.

14. A display device according to claim 12 that incorporates a mechanism to adjust the spacing between said off-axis focusing lenses to achieve inter-ocular adjustment.

15. A display device-according to claim 1 wherein at least one lens directly in front of and on the same optical axis as said digital micro-mirror device focuses the light from said light source to a binocular arrangement of lenses or prisms which in turn focus and direct said light to a pair of eyepieces and subsequently into the eyes of a viewer to produce two separate images.

16. A display device according to claim 1 wherein at least one of said digital micro-mirror device and said light source is rotated 90 degrees to the optical axis of the viewer and is optically coupled to the remainder of the optical apparatus by a partially silvered or plane mirror.

17. A display device according to claim 1 wherein said light source comprises a spinning drum of colored filter material oriented along its axis of rotation, where said drum consists of (1) at least three different sections, where each section filters light into one of three optical primary colors; (2) a white light source contained within said drum to provide said light; (3) a collimating lens assembly; (4) an optional diffuser; and (5) means for rotating said drum.

18. A display device according to claim 1 wherein said light source comprises (1) a collimating lens; and (2) two spinning drums that share a common axis of rotation but are rotated substantially 180 degrees out of phase with each other, that consist of at least 180 degrees of substantially opaque material in addition to the transparent filter material, wherein only one of said two drums passes light through said collimating lens at any time.

19. A display device according to claim 1 wherein said light source is at least one laser or light emitting diode.

20. A display device according to claim 1 wherein said light source comprises (1) three light sources each producing one of the optical primary colors; (2) a series of partially silvered mirrors and optional plane mirror or a series of dichroic mirrors and optional plane mirror; and (3) a diffuser; and (4) an optional collimating lens.

21. A display device according to claim 1 wherein said light source comprises (1) white light that passes through three color filters capable of filtering it into the three optical primary colors; (2) three separate fast response electronic shutters placed in the optical path of each of said filters; and (3) a series of partially silvered mirrors and optional plane mirror or a series of dichroic mirrors and optional plane mirror; and (4) a diffuser; and (5) an optional collimating lens.

22. A compact, lightweight display device comprising
   (A) a single digital micro-mirror device that comprises a multiplicity of individually electronically controlled mirrors, where each mirror has a first position and a second position;
   (B) a first light source positioned on one side of said digital micro-mirror device projecting primary light colors onto said digital micro-mirror display device;
   (C) a second light source positioned or the opposite side of said digital micro-mirror device projecting primary light colors onto said digital micro-mirror display device; means for transmitting light from said first light source that is reflected by the micro-mirrors that are in said first position onto a concave mirror which in turn converges said light to a focus point at the viewer's eye thereby eliminating the need for eyepiece optics; and
   (D) means for transmitting light from said second light source that is reflected by the micro-mirrors that are in said second position into onto a concave mirror which in turn converges said light to a focus point at the viewer's other eye thereby eliminating the need for eyepiece optics.

23. A compact, lightweight display device comprising (A) a single digital micro-mirror device that comprises a multiplicity of individually electronically controlled mirrors, where each mirror has a first position and a second position;

(B) a first light source positioned on one side of said digital micro-mirror device projecting primary light colors onto said digital micro-mirror display device;

(C) a second light source positioned on the opposite side of said digital micro-mirror device projecting primary light colors onto said digital micro-mirror display device;

(D) means for focusing light from said first light source that is reflected by the micro-mirrors that are in said first position to form a real image which is then magnified by eyepiece optics before being transmitted into one eye of a person viewing said display device; and (E) means for focusing light from said second light source that is reflected by the micro-mirrors that are in said second position to form a real image which is then magnified by eyepiece optics before being transmitted into the other eye of a person viewing said display device.

* * * * *